UNITED STATES PATENT OFFICE.

CARL MÖLLENHOFF, OF LEVERKUSEN, NEAR COLOGNE, GERMANY, ASSIGNOR TO FARBENFABRIKEN VORM. FRIEDR. BAYER & CO., OF ELBERFELD, GERMANY, A CORPORATION OF GERMANY.

PRODUCTION OF ALIZARIN FROM ANTHRAQUINONE.

1,036,881.  Specification of Letters Patent.  Patented Aug. 27, 1912.

No Drawing.  Application filed October 3, 1911. Serial No. 652,643.

*To all whom it may concern:*

Be it known that I, CARL MÖLLENHOFF, doctor of philosophy, chemist, citizen of the German Empire, residing at Leverkusen, near Cologne, Germany, have invented new and useful Improvements in the Production of Alizarin from Anthraquinone, of which the following is a specification.

The direct conversion of anthraquinone into alizarin was always attempted by the action of concentrated alkalis (either themselves or in the presence of oxidizing agents or of reducing agents) on anthraquinone.

I have now discovered that alizarin can be produced in a technically successful manner from anthraquinone by the action of a dilute alkali, (*i. e.* alkali lye containing less than 50 per cent. of alkali), if the reaction is carried out in the presence of a sulfite and either with or without the addition of oxidizing agents.

In order to illustrate the new process more fully the following example is given, the parts being by weight:—120 parts of anthraquinone, 25 parts of saltpeter, 82 parts of crystallized sodium sulfite, 1375 parts of a 29 per cent. caustic soda lye are heated in an autoclave for 3 to 4 days to 180–200° C. The product of the reaction is dissolved in water, air is passed through the solution to oxidize any products of reduction which may be present, the liquid is filtered and from the filtrate alizarin is separated in the usual way.

I claim:—

1. Process for the production of alizarin, which process comprises heating anthraquinone with a dilute alkali of less than 50 per cent. strength and a sulfite, substantially as described.

2. Process for the production of alizarin, which process consists in heating anthraquinone with a dilute alkali of less than 50 per cent. strength, a sulfite and an oxidizing agent, substantially as described.

3. Process for the production of alizarin, which process comprises heating anthraquinone with a dilute caustic soda lye of less than 50 per cent. strength and a sulfite, substantially as described.

4. Process for the production of alizarin, which process consists in heating anthraquinone with a dilute caustic soda lye of less than 50 per cent. strength, a sulfite and saltpeter, substantially as described.

In testimony whereof I have hereunto set my hand in the presence of two subscribing witnesses.

CARL MÖLLENHOFF. [L. s.]

Witnesses:
 I. NUFER,
 ALBERT NUFER.